US 8,068,414 B2

(12) United States Patent
Huegen et al.

(10) Patent No.: US 8,068,414 B2
(45) Date of Patent: Nov. 29, 2011

(54) ARRANGEMENT FOR TRACKING IP ADDRESS USAGE BASED ON AUTHENTICATED LINK IDENTIFIER

(75) Inventors: Craig Allen Huegen, Bartelso, IL (US); Ellis Roland Dobbins, San Jose, CA (US); Ian Foo, Raleigh, NC (US); Robert Eric Gleichauf, San Antonio, TX (US)

(73) Assignee: Cisco Technology, Inc., San Jose, CA (US)

( * ) Notice: Subject to any disclaimer, the term of this patent is extended or adjusted under 35 U.S.C. 154(b) by 1223 days.

(21) Appl. No.: 10/913,363

(22) Filed: Aug. 9, 2004

(65) Prior Publication Data

US 2006/0028996 A1 Feb. 9, 2006

(51) Int. Cl.
*H04L 12/22* (2006.01)
(52) U.S. Cl. ........................................ 370/230; 370/389
(58) Field of Classification Search .................. 370/230, 370/389, 395.2, 395.31, 395.32, 395.52, 370/395.54
See application file for complete search history.

(56) References Cited

U.S. PATENT DOCUMENTS

| | | | | |
|---|---|---|---|---|
| 6,115,376 A | | 9/2000 | Sherer et al. ................... | 370/389 |
| 6,185,680 B1 | | 2/2001 | Shimbo et al. | |
| 6,229,806 B1 | * | 5/2001 | Lockhart et al. ............... | 370/389 |
| 6,253,327 B1 | | 6/2001 | Zhang et al. | |
| 6,292,838 B1 | * | 9/2001 | Nelson ........................... | 709/236 |
| 6,307,837 B1 | | 10/2001 | Ichikawa et al. | |
| 6,393,484 B1 | * | 5/2002 | Massarani ...................... | 709/227 |
| 6,546,392 B1 | * | 4/2003 | Bahlmann ......................... | 707/9 |
| 7,035,281 B1 | * | 4/2006 | Spearman et al. ............. | 370/465 |
| 7,117,526 B1 | * | 10/2006 | Short ................................ | 726/5 |
| 7,234,163 B1 | * | 6/2007 | Rayes et al. ..................... | 726/22 |
| 7,360,086 B1 | * | 4/2008 | Tsuchiya et al. ............... | 713/168 |
| 7,360,245 B1 | * | 4/2008 | Ramachandran et al. ....... | 726/13 |
| 7,379,423 B1 | * | 5/2008 | Caves et al. .................... | 370/232 |
| 7,730,305 B2 | * | 6/2010 | Eun et al. ........................ | 713/168 |
| 2003/0055959 A1 | * | 3/2003 | Sato ................................ | 709/224 |
| 2003/0088665 A1 | * | 5/2003 | Sauermann .................... | 709/224 |
| 2003/0169713 A1 | * | 9/2003 | Luo ................................ | 370/338 |
| 2004/0028016 A1 | * | 2/2004 | Billhartz ........................ | 370/338 |
| 2005/0235363 A1 | * | 10/2005 | Hibbard et al. ................ | 726/28 |

FOREIGN PATENT DOCUMENTS

JP 2003178024 A * 6/2003

OTHER PUBLICATIONS

Binkley et. al., "Authenticated Ad Hoc Routing at the Link Layer for Mobile Systems," 2001, Wireless Networks 7, pp. 139-145.*

(Continued)

*Primary Examiner* — Aung S Moe
*Assistant Examiner* — Curtis A Alia
(74) *Attorney, Agent, or Firm* — Leon R. Turkevich (57) ABSTRACT

Link layer authentication information is supplied by a link layer authentication device to an access router for tracking IP address usage by a client device. The authentication information supplied to the access router includes an authenticated client identifier and a corresponding authenticated link identifier for the client device that attached to the network based on the authenticated link identifier. The access router, in response to receiving a message that specifies the authenticated link identifier and a source IP address, adds the source IP address to a cache entry that specifies the authenticated client identifier and the corresponding authenticated link identifier, and outputs to an audit resource a record that specifies the source IP address and the authenticated link identifier.

21 Claims, 5 Drawing Sheets

OTHER PUBLICATIONS

Yegin et al., "Secure Network Access Using Router Discovery and AAA", UNAP Working Group, Internet Draft, draft-yegin-unap-snard-00, Nov. 2001.

Rigney et al., "Remote Authentication Dial In User Service (RADIUS)", Network Working Group, Request for Comments: 2865, Jun. 2000.

Smith, "Cisco's LEAP provides superior WLAN security", <http://techrepublic.com.com/5102-6265-5034569.html>, May 6, 2003.

Calhoun et al, "Extensible Authentication Protocol Support in RADIUS", RADIUS Working Group Internet Draft <draft-ietf-radius-eap-05.txt>, May 8, 1998, pp. 1-17.

U.S. Appl. No. 09/981,182, filed Oct. 16, 2001, Schnizlein.

U.S. Appl. No. 10/210,513, filed Jul. 31, 2002, Droms et al.

* cited by examiner

ARRANGEMENT FOR TRACKING IP ADDRESS USAGE BASED ON AUTHENTICATED LINK IDENTIFIER

BACKGROUND OF THE INVENTION

1. Field of the Invention

The present invention relates to management of Internet Protocol (IP) addresses used by network nodes. In particular, the present invention relates to tracking usage of IP addresses back to network nodes, for example based on the IP addresses having been used for illegal activity such as Denial of Service, virus/worm attacks, distribution of spam (unwanted e-mail), or for tracking usage of IP addresses relative to Quality of Service policies, or to monitor node mobility.

2. Description of the Related Art

Network administrators have encountered a dramatic increase in the number of Denial of Service (DOS) attacks and spoof packet attacks in the last few years. It has always been difficult to identify the source of the attacks, namely the individual host computer that is specifically responsible for the attacks. In particular, IP-based networks typically include resources for maintaining network operations; however, network state is not preserved for future analysis. Hence, if an attack is detected, there is no audit trail preserved that enables an authoritative source to trace the origin of the attack with sufficient information to identify a specific individual user.

In addition, enforcement efforts in protecting against various forms of abuse are frustrated due to the untraceability of the network address, because there is no authoritative technique for correlating a network address to a user identity.

Monitoring of link layer addresses (e.g., MAC layer addresses) is insufficient, since the link layer information that could be used to identify the origin of the attack is lost after the packet has passed the first hop router. The IEEE 802.1x standard provides for layer 2 authentication but does not specify methods for collecting layer 3 addressing information. Further, efforts to block a link layer address do not scale well in deployment; link layer addresses also can be "spoofed", and computers may have multiple network interfaces having respective link layer addresses, for example a first MAC address for a wired IEEE 802.3 interface, and a second MAC address for a wireless IEEE 802.11 interface.

Further, the link layer is not necessarily tied to the IP network layer; hence, a user that is attached by a link layer can send packets onto the network with an arbitrary IP network source address, for example dynamically-allocated network addresses based on Dynamic Host Configuration Protocol (DHCP) or dial-up services. This arbitrary network address utilized by the user also is typically the only reference available to an enforcement entity to identify the requesting source.

Attempts at providing authentication services have addressed assigning an authenticated IP address to a user, such attempts fail to address the problem that a malicious user may still use an unassigned address. Examples of existing authentication services include Remote Authentication Dial-In User Service (RADIUS) as described in the Internet Engineering Task Force (IETF) Request for Comments (RFC) 2865, available at the IETF website address "www.ietf.org/rfc/rfc2865.txt". The RADIUS authentication records an IP address having been assigned to a user. In particular, a user of a dial-up PPP service may connect to a service via an identifiable dial-up port (e.g., "41"), provide authentication information including user identifier (e.g., "john_adams") and password; hence, the RADIUS service can authenticate the user identifier (e.g., "john_adams") based on the password, and correlate the authenticated user identifier to the dial-up port "41". The RADIUS service also will determine that the PPP negotiation has supplied the user a prescribed assigned IP address "X.Y.B.C"; hence, the RADIUS service can store in its internal database that the assigned IP address "X.Y.B.C" was assigned to user "john_adams" on the dial-up port "41".

As described above, however, the existing systems have monitored only the IP address that have been assigned to a user, and not necessarily the actual IP addresses that are used by the user. However, the same enforcement issues arise because a source node may use an alternate IP address (e.g., "Y.X.Q.R") that differs from the IP address having been assigned to the user (e.g., "X.Y.B.C").

Although application-level proxy resources and Network Address Translator (NAT) devices are able to utilize proxy authentication to associate user names to IP addresses, there is no guarantee that all data traffic will pass through the application-level proxy resources or the NAT devices. Hence, a rogue device can circumvent the application-level proxy resources and NAT devices to avoid detection.

SUMMARY OF THE INVENTION

There is a need for an arrangement that provides a reliable and consistent tracking of any IP address used by a network node, regardless of whether the IP address is assigned to the network node by an authoritative source.

There also is a need for an arrangement that provides reliable tracking of any IP address used by a network node, including identification of the network node by a link identifier.

There also is a need for an arrangement that enables an audit trail to be established for identification of an entity (e.g., a user or an executable resource in a network device) having used an identified IP address.

These and other needs are attained by the present invention, where link layer authentication information is supplied to an IP router for tracking IP address usage by a client device. The authentication information supplied to the IP router includes an authenticated client identifier and a corresponding authenticated link identifier for the client device that attached to the network based on the authenticated link identifier. The IP router, in response to receiving a message that specifies the authenticated link identifier and a source IP address, adds the source IP address to a cache entry that specifies the authenticated client identifier and the corresponding authenticated link identifier, and outputs to an audit resource a record that specifies the source IP address and the authenticated link identifier.

Hence, the audit resource is able to maintain a history of IP addresses used by authenticated link identifiers, enabling administrators to track IP addresses that are used based on the associated authenticated link identifiers and the corresponding client identifiers.

One aspect of the present invention provides a method in an Internet Protocol (IP) based router in a network. The method includes creating a cache entry specifying an authenticated client identifier and a corresponding authenticated link identifier for a client device attached to the network based on the authenticated link identifier. The method also includes receiving a message that specifies the authenticated link identifier and a source IP address, and adding the source IP address to the cache entry specifying the authenticated link identifier based on parsing the message. The method also includes outputting to an audit resource a record that specifies the source IP address and the authenticated link identifier.

Another aspect of the present invention provides a method in a network having a link layer authentication device and an IP router. The method in the link layer authentication device includes detecting an establishment of a link with a client device on an identified link port, and attempting authentication of the client device attached to the identified link port based on sending, to an authentication server, client device information including a client identifier. The method in the link layer authentication device also includes outputting to the IP router, based on authentication of the client device by the authentication server, the client identifier as an authenticated client identifier and an authenticated link identifier relative to the corresponding link port. The method in the IP router includes receiving the authenticated client identifier and the corresponding authenticated link identifier, and creating a cache entry specifying the authenticated client identifier and the corresponding authenticated link identifier. The method in the IP router also includes receiving a message that specifies the authenticated link identifier and a source IP address, adding the source IP address to the cache entry specifying the authenticated link identifier based on parsing the message, and outputting to an audit resource a record that specifies the source IP address and the authenticated link identifier.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
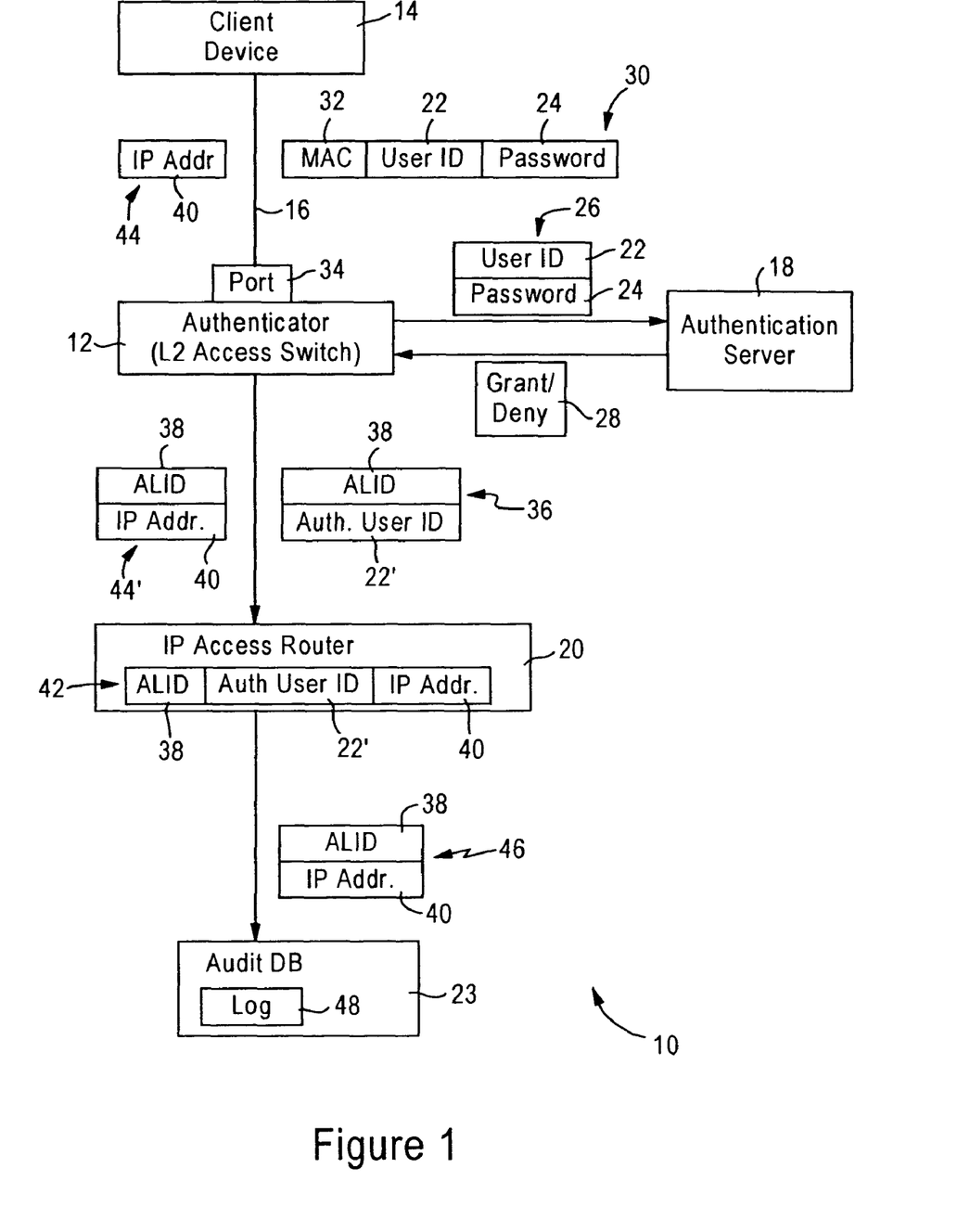
FIG. 1 is a diagram illustrating a network configured for providing link layer authentication for a client device, and tracking of IP addresses used by the client device, according to an embodiment of the present invention.

FIG. 1 is a diagram illustrating a network 10 configured for providing link layer authentication for a client device 14, and creating audit logs for tracking of IP addresses used by the client device 14, according to an embodiment of the present invention. The network 10 includes an link layer authentication device (i.e., authenticator) 12, an authentication server 18, an IP based access router 20, and an audit database 23.

The authenticator 12 is configured for detecting establishment of a link 16 with the client device 14 on an identified link port 34. As described below, the authenticator 12 is configured for authenticating the client device 14 based on sending an authentication request 26 specifying a client identifier (e.g., an entity identifier) 22 and password 24 to an authentication server 18.

In response to receiving an approval 28 from the authentication server 18, the authenticator 12 is configured for outputting to the access router 20 an authentication message 36 that includes an authenticated client identifier (e.g., authenticated User ID) 22' that uniquely identifies the entity requesting the IP address, and an authenticated link identifier (ALID) 38. The access router 20 caches the authenticated client identifier 22' and the authenticated link identifier 38 in a cache entry 42 configured for specifying the authenticated client identifier 22', the authenticated link identifier 38, and an IP address used by the device 14 that accesses the network 10 using the authenticated link identifier 38. Note that each cache entry 42 preferably also includes a time stamp (not shown) that indicates the age of the entry, which can be used to validate, manage and diagnose authorized activity.

Hence, in response to the access router 20 detecting a message 44' specifying the authenticated link identifier 38 and a source IP address 40 having been generated by the client device 14, the IP router updates its cache entry 42 to specify that the owner of the authenticated link identifier 38 (the client device 14 having the authenticated user identifier 22') is using the IP address 40. In addition, the access router 20 is configured for outputting to the audit database 23 a record 46 that specifies at least the source IP address 40 and the corresponding authenticated link identifier 38. Hence, the audit database 23 is able to maintain a log 48 of all IP addresses used by the client device 14.

Figure 2A:
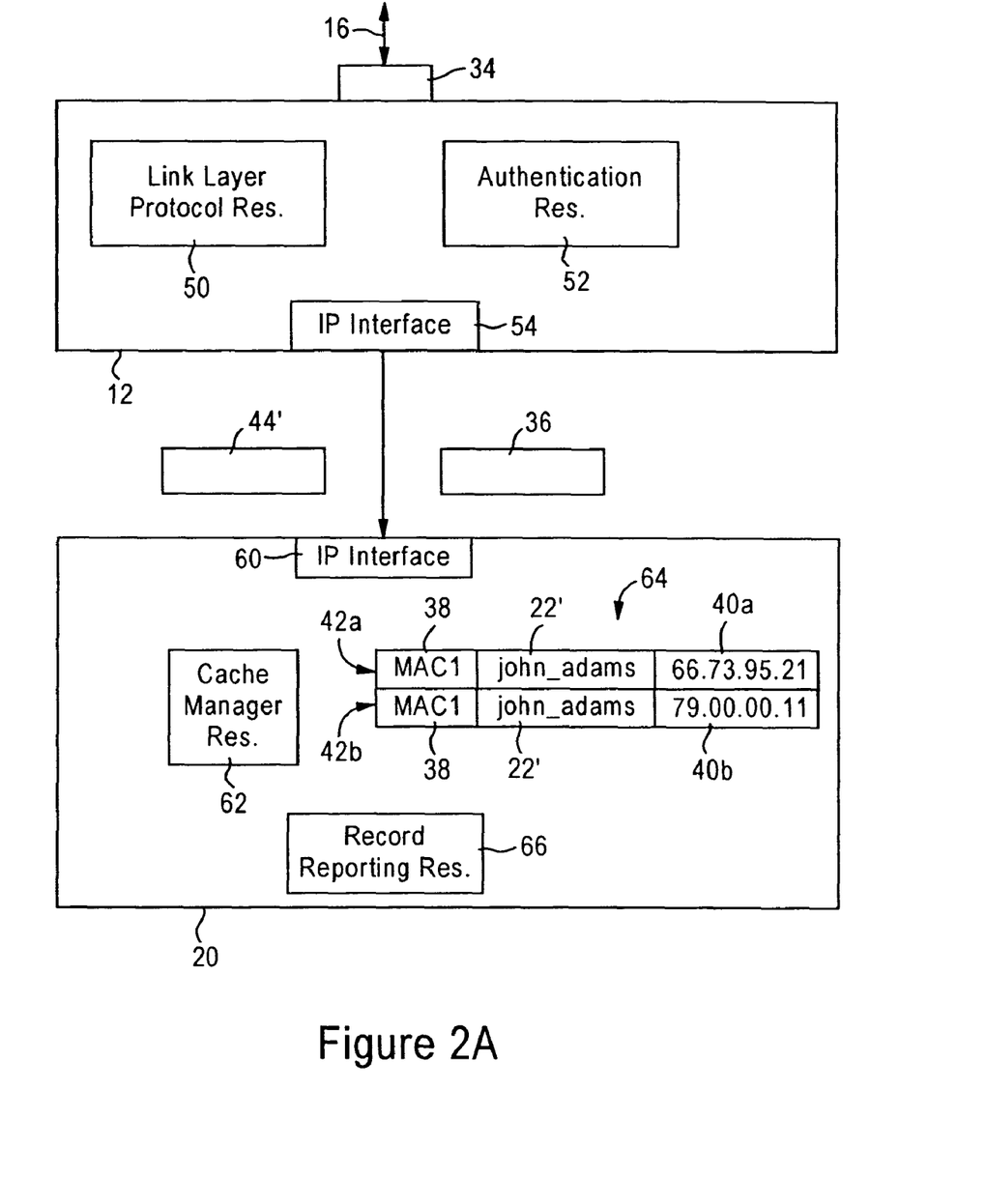
FIGS. 2A and 2B are diagrams illustrating in further detail the link layer authentication device and the IP router of FIG. 1, according to an embodiment of the present invention.
Figure 2B:
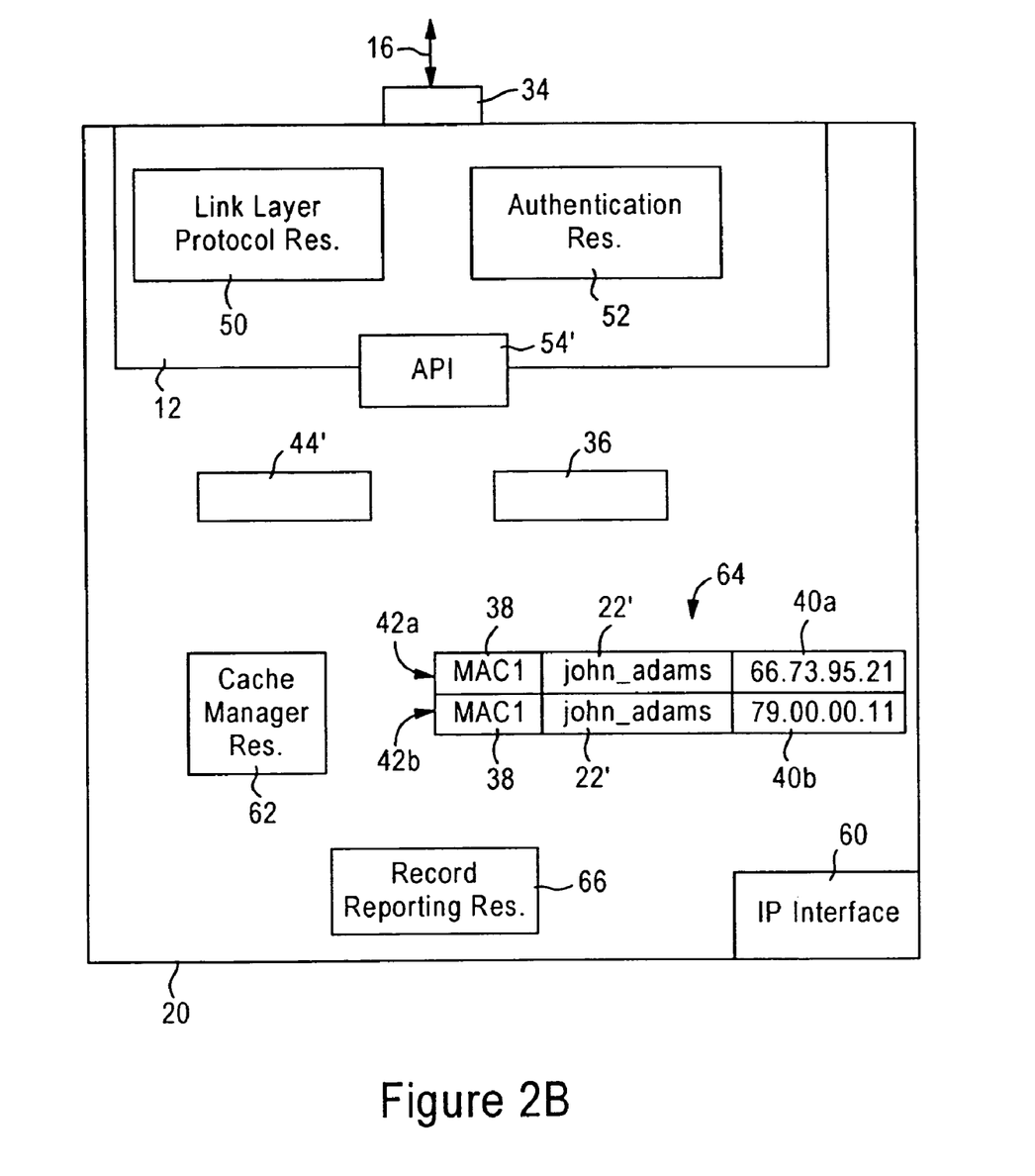

FIGS. 2A and 2B are diagrams illustrating exemplary implementations of the authenticator 12 and the access router 20, according to an embodiment of the present invention. FIG. 2A illustrates that the authenticator 12 and the access router 20 are implemented as distinct units that communicate by exchanging messages 36 according to a prescribed data link protocol (e.g., IP over Ethernet). FIG. 2B illustrates that the authenticator 12 is implemented as a link layer authentication portion of the access router 20; in this case, the messages 36 and 44' may be referenced by function calls that include memory pointers identifying the relevant data units 36 and 44' in buffer memory.

The authenticator 12 of FIGS. 1, 2A and 2B is implemented, for example, as part of a network access device for the client device 14. In particular, the authenticator 12 illustrated in FIGS. 1 and 2A includes a link layer protocol resource 50, an authentication resource 52, and an IP interface 54; the authenticator 12' of FIG. 2B includes a resource interface 54' (e.g., an Application Programming Interface (API)) in place of the IP interface 54 for passing the messages 36 and 44' using memory pointers.

The link layer protocol resource 50 is configured for providing link layer access services to the network 10 based on the client device 14 establishing a physical or logical link 16 (e.g., dial-up, wired Ethernet IEEE 802.3 connection, wireless IEEE 802.11 connection, etc.) with the authenticator 12 according to a prescribed link layer (i.e., OSI layer 2) protocol. The network access device can be implemented as a layer 2 access point, a layer 2 access switch, etc. In addition, the network access device can establish the link 16 using various protocols depending on the network medium used to connect the authenticator 12 and the client device 14, for example IEEE 802.1x Extensible Authentication Protocol (EAP) or the Lightweight Extensible Authentication Protocol (LEAP)—authenticated sessions on a layer 2 access point. LEAP is a proprietary authentication process for associating wireless clients to an access port using an authentication server, and is commercially available from Cisco Systems, San Jose, Calif.

The client device 14 is configured for attaching to a port 34 of the network access device, assumed herein to be part of the authenticator 12. As shown in FIG. 1, upon establishment of the link 16 according to a prescribed link layer protocol, the client device 14 is configured for outputting onto the link 16 a message 30 specifying an assigned link address 32 for reception by an identified port (e.g., switch port) 34 of the authenticator 12. As recognized in the art, the identifier for the port 34 may be a hardware-based port identifier based on the port being one of a plurality of hardware ports (e.g., Ethernet switch port, modem bank, etc.), or the identifier for the port 34 may be a session identifier that is used by the authenticator 12 to identify the link 16 established with the client device.

The authentication resource 52 of FIGS. 2A and 2B is configured for determining an identity 22 of the client device (e.g., user identifier "john_adams"), for example based on the client device 14 providing a user identifier 22 and a password 24. For example, the authentication resource 52 and the client device 14 may perfrom IEEE 802.1x EAP authentication, where the client device 14 (e.g., the IEEE 802.1x supplicant) provides the user identifier 22 and password 24 to the authenticator 12. The user identifier 22 is used to uniquely identify the entity (e.g., a user or executable resource within the client device) requesting the IP address. The authentication resource 52 is configured for sending the authentication request 26 shown in FIG. 1 to the authentication server 18, based on forwarding the user identifier 22 and the password 24. The authentication server 18 is configured for authenticating the mapping between the link identifier (e.g., the identifier of the port 34), the user identifier 22, and the password 24, and in response sending a response 28 indicating either acceptance or denial of the authentication request 26. The above-described authentication may be implemented according to known link layer authentication protocols such as IEEE 802.1x EAP authentication or LEAP authentication.

In response to receiving an authentication verification 28 from the authentication server 18 accepting the authentication request, the authentication resource 52 marks the link identifier (e.g., the identifier of the port 34) as an authenticated link identifier 38, marks the client identifier 22 as an authenticated client identifier 22', and sends to the IP router 20 an authentication message 36 that specifies the authenticated link identifier 38 (e.g., port identifier 34), and the authenticated client identifier 22'. The authentication message 36 is output by the IP interface 54 (FIG. 2A) or the resource interface 54'.

Although the authenticated link identifier 38 is illustrated as based on the port identifier 34, the layer 2 (e.g., MAC) address 32 could be used so long as the address 32 can be authenticated by the authentication server 18.

The IP router 20 is configured as a first-hop router (e.g., default gateway) for enabling the client device 14 to access a wide area packet switched network such as the Internet (not shown). As illustrated in FIGS. 2A and 2B, the IP router 20 includes an IP interface 60, a cache manager resource 62, a cache 64 having cache entries (e.g., 42a, 42b), and a record reporting resource 66. The IP interface 60 of FIG. 2A is configured for receiving the authentication message 36 having been generated by the authentication resource 52 and including the authenticated client identifier 22' and the authenticated link identifier 38; the IP interface 60 of FIG. 2A also is configured for receiving packets 44' having been forwarded by the authenticator 12 based on reception of the original packet 44 by the authenticator 12 from the client device 14.

The cache manager 62 is configured for storing a cache entry 42 (e.g., 42a, 42b) that includes the authenticated link identifier 38, the authenticated client identifier 22', any IP address 40 used by the client device 14, and preferably a time stamp. In response to receiving the authentication message 36, the cache manager 62 is configured for creating a new cache entry (e.g., 42a) that includes the authenticated link identifier 38 and the authenticated client identifier 22' specified in the authentication message 36. Note, however, that the authentication message 36 does not specify any IP address expected be used by the client device 14, since the client device 14 may be an untrusted device that may use an unknown IP address.

According to the disclosed embodiment, the cache manager resource 62 also is configured for parsing a received packet 44' having been forwarded by the authenticator 12 from the client device 14. As illustrated in FIG. 1, the client device 14 outputs a packet 44 having an untrusted IP address 40 to the authenticator 12 according to a prescribed link layer protocol. The authentication resource 52 authenticates the link layer address 32 used by the client device 14, and outputs the packet 44' with the authenticated link identifier 38 (e.g., an authenticated layer 2 address 32 or an added port identifier 34 if different from the link layer address 32) the IP address 40, and associated payload data (not shown). It should be noted that the authentication resource 52 is configured for verifying the authenticity of the layer 2 address 32 of each packet 44 output by the client device 14, for example based on caching the relevant information used during authentication (e.g., 22', 32, 34, 38), to prevent "spoofing" of the layer 2 address 32.

The cache manager resource 62 responds to the received data packet 44' by identifying the authenticated link identifier 38 in the received packet 44', and adding the source IP address (e.g., "66.73.95.21") 40a of the packet to the corresponding cache entry 42a, such that the cache entry 42a specifies the authenticated link identifier 38, the authenticated client identifier 22', and the IP address 40a used by the client device 14. The cache manager resource 62 also is configured for refreshing or clearing a cache entry in response to a prescribed condition (e.g., timeout due to inactivity or roaming, dynamic VLAN assignment, quarantine or containment due to network access control or network infection containment protocols, etc.).

The reporting resource 66 is configured for generating and outputting to the audit resource (e.g., the audit database 23) a record 46 that represents transmission of the packet 44' from the client device 14, in response to the cache manager resource 62 adding the IP address (e.g., 40a) to the cache entry 42a. The record 46 includes the source IP address 40, the authenticated link identifier 38, and optionally the associated authenticated client identifier (not shown in FIG. 1). Hence, the audit database 23 stores the record 46 for traceability of the traffic generated by the client device 14.

Note that the IP router 20 may employ caching to minimize the number of records 46 that need to be sent to the audit database; hence, a new record 46 needs to be sent only if there is a new cache entry 42b (e.g., there is a change in any one of the authenticated link identifier 38, the user identifier 22', or the IP address 40b).

Hence, if the client device 14 initiates a denial of service attack on a targeted node based on using a "spoofed" IP address 40 and sending packets to the destination IP address of the targeted node, the audit database 23 would have a log 48 of the authenticated link identifier 38 and the spoofed IP address(es) 40. After the denial of service attack, the administrator of the targeted node would be able to determine the spoofed IP address(es) 40 based on logs at the targeted node (or associated firewalls); the administrator could then determine the entity that had used the spoofed IP address(es) 40 based on identifying from the log 48 that the authenticator 12 had authenticated the port 34 at that point in time (based on the authenticated link identifier 38).

Figure 3A:
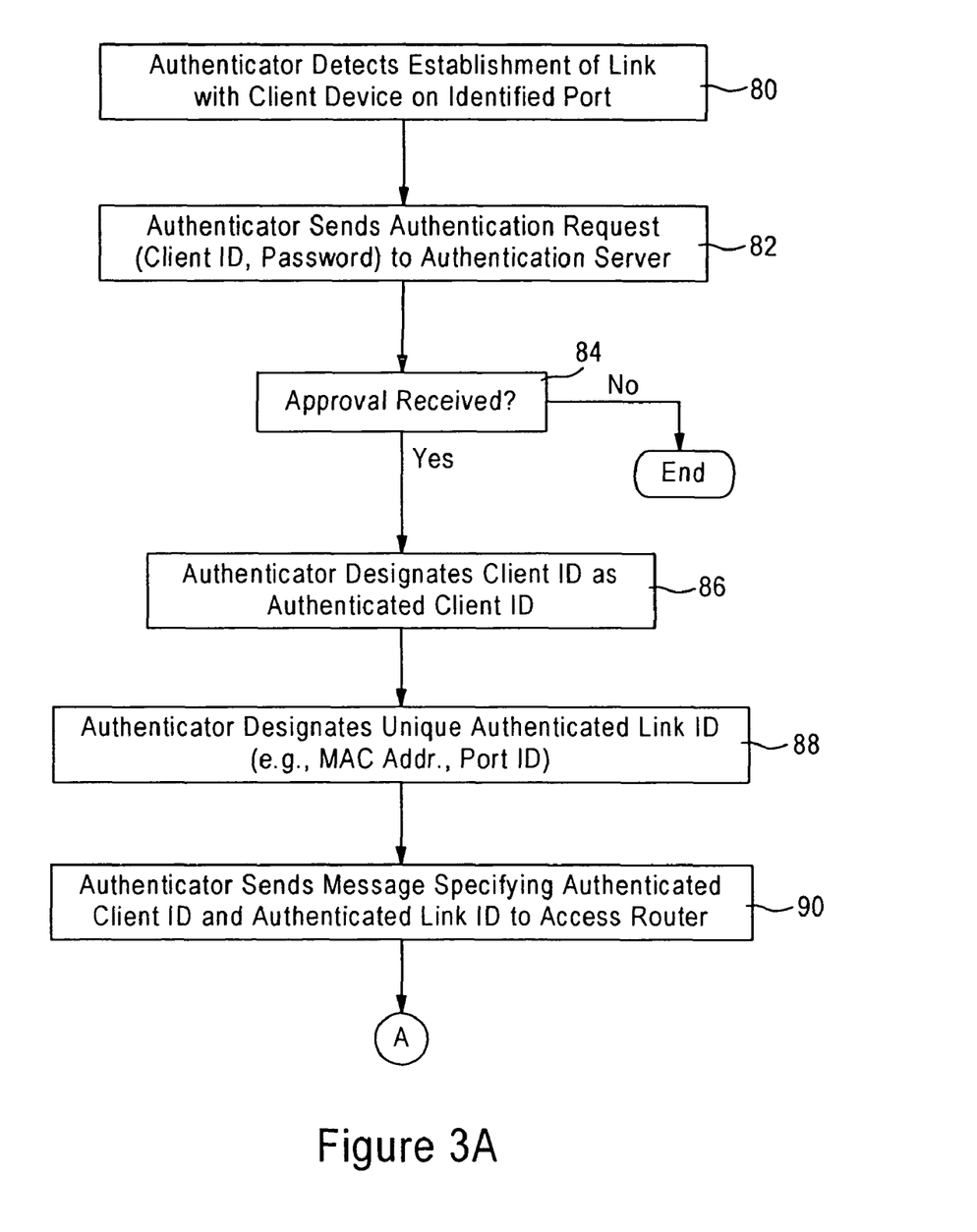
FIGS. 3A and 3B are diagrams summarizing the method of providing link layer authentication and IP address tracking, according to an embodiment of the present invention.
Figure 3B:
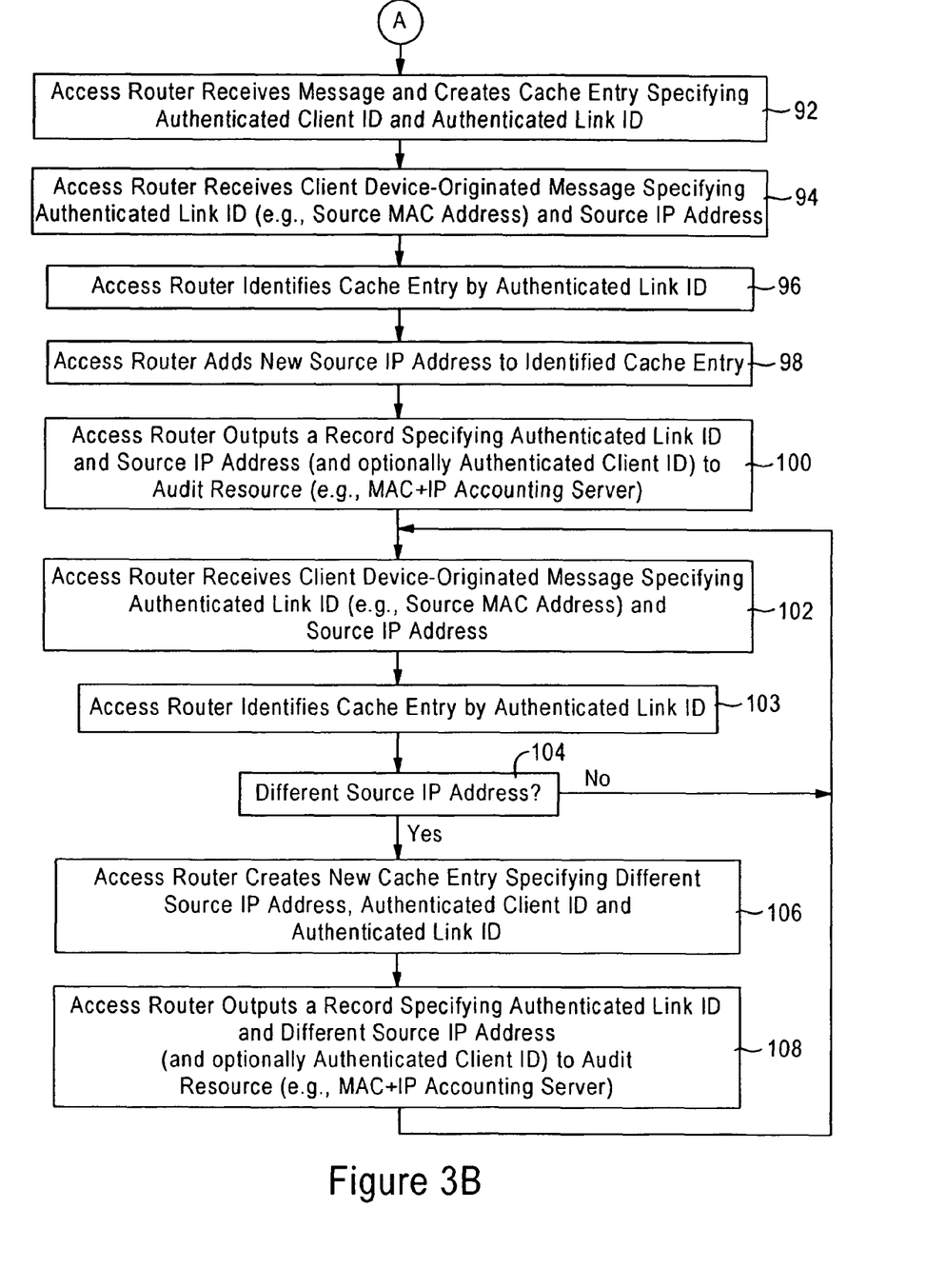

FIGS. 3A and 3B are diagrams illustrating the methods of tracking IP address usage by the authenticator 12 and the access router 20, respectively, according to an embodiment of the present invention. In particular, FIG. 3A illustrates the method of providing link layer authentication by the authenticator 12, and FIG. 3B illustrates the method of IP address tracking by the access router, according to an embodiment of the present invention. The steps described below with respect to FIGS. 3A and 3B can be implemented in the respective authenticator 12 and access router 20 as executable code stored on a computer readable medium (e.g., floppy disk, hard disk, EEPROM, CD-ROM, nonvolatile RAM, etc.), or propagated via a computer readable transmission medium (e.g., fiber optic cable, electrically-conductive transmission line medium, wireless electromagnetic medium, etc.).

The method begins in step 80, where the link layer protocol resource 50 in the authenticator 12 detects establishment of the link 16 with the client device 14 on the identified port 34. The authentication resource 52 sends in step 82 an authentication request 26 to the authentication server 18, shown in FIG. 1, that includes the user ID 22 and password 24. The authentication server 18 performs authentication in response to the request 26, for example according to IEEE 802.1x EAP or LEAP, and outputs a response 28 indicating either approval or denial of the request.

If in step 84 the authentication resource 52 detects that the response 28 indicates approval, the authentication resource 52 designates in step 86 the client identifier 22 as an authenticated client identifier 22' and designates in step 88 a unique authenticated link identifier 38, for example based on the MAC address 32, the port identifier 34, etc. The authentication resource 52 generates in step 90 the authentication message 36 including the authenticated client identifier 22' and the authenticated link identifier 38, which is then output by the IP interface 54 or the resource interface 54'.

Referring to FIG. 3B, the IP interface 60 (or the resource interface 54' of FIG. 2B) receives in step 92 the authentication message 36 specifying the authenticated client identifier 22' and the authenticated link identifier 38, and in response the cache manager resource 62 parses the authentication message 36 and creates a new cache entry (e.g., 42a) specifying the authenticated client identifier (e.g., "john_adams") 22' and the authenticated link identifier (e.g., "MAC1") 38. In response to the IP interface 60 receiving in step 94 the client device-originated IP packet 44' specifying the authenticated link identifier (e.g.,"MAC1") 38 and the source IP address (e.g., "66.73.95.21") 40a, the cache manager resource 62 identifies in step 96 the cache entry 42a based on the matching authenticated link identifier 38.

The cache manager resource 62 adds in step 98 the new source IP address (e.g., "66.73.95.21") 40a to the identified cache entry (e.g., 42a), enabling the access router 20 to identify the client device 14 that is using the IP address 40a.

In response to the adding of a source IP address (e.g., 40a) to a cache entry (e.g., 42a), the record reporting resource 66 generates in step 100 a record 46 that specifies the authenticated link identifier 38, the source IP address 40a, and optionally the authenticated client identifier 22'. The IP interface 60 outputs the record 46 to the audit database 23 for storage in the log 48.

Hence, an administrator of the authenticator 12 can access the log 48 to identify that the source of the IP address 40a was the client device 14 based on the authenticated link identifier 38, and optionally also the authenticated client identifier 22'.

Note that the cache manager resource 62 may generate another entry (e.g., 42b) for the same client device 14 if a different IP address (e.g., "79.00.00.11") 40b is used. Hence, assuming in step 102 that the IP interface 60 of the access router 20 receives another client-originated message 44', the cache manager resource 62 identifies in step 103 the stored cache entry 42a based on the authenticated link identifier 38 specified in the new message 44'.

If in step 104 the cache manager resource 62 determines that the newly-received message 44' specifies a source IP address (e.g., "79.00.00.11") 40b that differs from the source IP address ("66.73.95.21") 40a specified in the cache entry 42a, the cache manager resource 62 creates in step 106 a new cache entry 42b that specifies the new source IP address 40b, the authenticated client identifier 22', and the authenticated link identifier 38. In response to creation of the new cache entry 42b specifying the new IP address 40b, the reporting resource 66 generates in step 108 a new record 46 specifying the authenticated link identifier 38 and the new IP address 40b of the newly-created cache entry 42b, and optionally the authenticated client identifier 22'; the new record 46 is output by the IP interface 60 to the audit database 23.

According to the disclosed embodiment, a record is maintained of an IP address used by an entity, as well as the authenticated user identity of that entity using the IP address. As used herein, the term "entity" refers to any consumer of an IP address for use as a source IP address in sending a packet onto a network: examples of an entity include a user of an e-mail client, a user of a browser, an executable resource in a Voice over IP telephone configured for using a source IP address for establishing a Voice over IP telephone call, an executable resource configured for fetching updated information (e.g., virus update software, software update software) etc.

Moreover, the ability to correlate a network address to an entity enables a network access device (e.g., a firewall device, a catalyst switch, etc.) to implement network infection containment, where an unauthorized computer (or a previously-authorized computer having been compromised due to some agent) is placed in a quarantine zone to minimize damage to the network, while providing sufficient access for the unauthorized computer to obtain remote remediation services (e.g., removal of viruses, etc.). Deployment of a interface to current state data in the audit database or the access router also may enable targeted nodes to identify a source of a Denial of Service (DoS) attack in real time by sending a request to an authoritative source (not shown) to query the interface for the identity of the entity using the source IP address.

Note that the disclosed embodiment also can be used in networks utilizing a shared medium, since each node will require some type of unique address that enables traffic to reach that node. However, it is preferred that a secure authentication is used between an authenticator and the authenticated device to prevent other nodes on the shared medium from detecting the authentication process between the authenticator and the authenticated device.

As described above, the client identifier 22 and authenticated client identifier 22' are used to uniquely identify a entity (e.g., user, executable resource) that is to be a consumer of an IP address for use as a source IP address in sending a packet onto a network; hence, client identifier 22 and the authenticated client identifier 22' can be based on machine-generated credentials, as opposed to any user-supplied credentials. However, note that the authenticator 12 still outputs an authenticated client identifier 22' and an authenticated link identifier 38 each having been generated by a known administrative control. Also note that the authenticated client identifier 22' may be implemented using other methods of identification, including digital signature, digital certificate, etc., where the client identifier 22 can be implemented in the form of a digital signature/certificate prior to validation/acceptance by the authenticator 12, and the authenticated client identifier 22' can be implemented in the form of the digital signature having been validated/accepted by the authenticator 12.

Although existing network switches may store current state of the switch in the form of layer 2 and layer 3 addresses for a given network node, the disclosed embodiment associates the layer 3 IP address to the authenticated link identifier. Note that the term "authenticated link identifier" encompasses various link layer identifiers depending on implementation, for example MAC addresses for Ethernet (IEEE 802.3) addresses, wireless LAN (IEEE 802.11) addresses, dial-up port for PPP based dial-up connections, authenticated port or session identifier in a Virtual Private Network (VPN) concentrator, etc.

Also note that disclosed arrangement does not require configuration of application-level proxies, since the disclosed arrangement records all IP addresses used by the client device, regardless of the type of IP traffic output by the client device.

Also note that the disclosed embodiment is equally applicable to IPv4 and IPv6 address schemes.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an Internet Protocol (IP) based router in a network, the method comprising:

creating by the router a cache entry in the router and that specifies an authenticated client identifier and a corresponding authenticated Media Access Control (MAC) address for a client device attached to the network based on the authenticated MAC address, the authenticated MAC address based on link layer authentication of a MAC address used by the client device relative to the authenticated client identifier and according to a prescribed link layer authentication protocol to authenticate use of the MAC address by the client device and to prevent spoofing of the authenticated MAC address;

receiving by the router a message originated by the client device and that specifies the authenticated MAC address and a source IP address, the router implemented as a default gateway for enabling the client device to access the network, wherein any packet output by a given client device and having a corresponding MAC address that has not been authenticated for use by the given client device is contained from access to the network;

the router responding to receiving the message originated by the client device by adding the source IP address to the cache entry specifying the authenticated MAC address based on parsing the message; and the router responding to adding the source IP address to the cache entry by outputting to an audit resource a record that specifies the source IP address and the authenticated MAC address.

2. The method of claim 1, wherein the outputting includes specifying within the record the corresponding authenticated client identifier.

3. The method of claim 1, further comprising:

receiving a second message that specifies the authenticated MAC address and a second source IP address;

the creating including creating a second cache entry specifying the authenticated client identifier, the corresponding authenticated MAC address, and the second source IP address, based on having determined the second source IP address is distinct from the source IP address;

the outputting including outputting a second record specifying the second source IP address and the authenticated MAC address based on creation of the second cache entry.

4. The method of claim 1, further comprising receiving the authenticated client identifier and the corresponding authenticated MAC address in a message from a link authentication device, the link authentication device having established with the client device a link having the corresponding authenticated MAC address.

5. The method of claim 1, wherein the IP based router includes a link layer authentication portion, the method further comprising:

detecting by the link layer authentication portion establishment of a link with the client device on an identified link port;

sending to an authentication server, by the link layer authentication portion, client device information including a client identifier; and selectively designating the client identifier as the authenticated client identifier and the authenticated MAC address relative to the identified link port, based on having received an approval of the client identifier by the authentication server.

6. A method in a network, the method comprising:

in a link layer authentication device:

(1) detecting an establishment of a link with a client device on an identified link port of the link layer authentication device, (2) attempting authentication of a MAC address used by the client device attached to the identified link port based on sending, to an authentication server, client device information including a client identifier, and (3) outputting to an IP router, based on authentication of the client device by the authentication server relative to the client identifier, an authentication message specifying the client identifier as an authenticated client identifier and the MAC address used by the client device as an authenticated Media Access Control (MAC) address that is authenticated according to a prescribed link layer authentication protocol to authenticate the use of the MAC address by the client device and to prevent spoofing of the authenticated MAC address; and in the IP router:

(1) receiving the authentication message specifying the authenticated client identifier and the corresponding authenticated MAC address, (2) creating a cache entry in the IP router in response to receiving the authentication message, the cache entry specifying the authenticated client identifier and the corresponding authenticated MAC address, (3) receiving a message originated by the client device and that specifies the authenticated MAC address and a source IP address, the IP router implemented as a default gateway for enabling the client device to access the network, (4) the IP router responding to receiving the message originated by the client device by adding the source IP address to the cache entry specifying the authenticated MAC address based on parsing the message, and (5) the IP router responding to adding the source IP address to the cache entry by outputting to an audit resource a record that specifies the source IP address and the authenticated MAC address;
wherein any packet output by a given client device and having a corresponding MAC address that has not been authenticated for use by the given client device is contained from access to the network.

7. The method of claim 6, wherein the outputting by the IP router includes specifying within the record the corresponding authenticated client identifier.

8. The method of claim 6, further comprising in the IP router:
receiving a second message that specifies the authenticated MAC address and a second source IP address;
the creating including creating a second cache entry specifying the authenticated client identifier, the corresponding authenticated MAC address, and the second source IP address, based on having determined the second source address is distinct from the source IP address;
the outputting including outputting a second record specifying the second source IP address and the authenticated MAC address based on creation of the second cache entry.

9. An Internet Protocol (IP) based router configured for outputting IP packets in a network, the router comprising:
means for creating a cache entry in the router and that specifies an authenticated client identifier and a corresponding authenticated Media Access Control (MAC) address for a client device attached to the network based on the authenticated MAC address, the authenticated MAC address based on link layer authentication of a MAC address used by the client device relative to the authenticated client identifier and according to a prescribed link layer authentication protocol to authenticate the use of the MAC address by the client device and to prevent spoofing of the authenticated MAC address, wherein any packet output by a given client device and having a corresponding MAC address that has not been authenticated for use by the given client device is contained from access to the network;
means for receiving a message originated by the client device and that specifies the authenticated MAC address and a source IP address, the means for creating responding to receiving the message originated by the client device by adding the source IP address to the cache entry specifying the authenticated MAC address based on parsing the message, the router implemented as a default gateway for enabling the client device to access the network; and
means for outputting to an audit resource a record that specifies the source IP address and the authenticated MAC address in response to the adding of the source IP address to the cache entry.

10. The router of claim 9, wherein the record specifies the corresponding authenticated client identifier.

11. The router of claim 9, wherein:
the means for receiving receives a second message that specifies the authenticated MAC address and a second source IP address;
the means for creating creates a second cache entry specifying the authenticated client identifier, the corresponding authenticated MAC address, and the second source IP address, based on having determined the second source IP address is distinct from the source IP address;
the means for outputting outputs a second record specifying the second source IP address and the authenticated MAC address based on creation of the second cache entry.

12. The router of claim 9, wherein the means for receiving receives the authenticated client identifier and the corresponding authenticated MAC address in a message from a link authentication device, the link authentication device having established with the client device a link having the corresponding authenticated MAC address.

13. The router of claim 9, further comprising a link layer authentication portion, the link layer authentication portion further comprising:
means for detecting establishment of a link with the client device on an identified link port;
means for sending, to an authentication server, client device information including a client identifier, the means for sending selectively designating the client identifier as the authenticated client identifier and the authenticated MAC address relative to the identified link port, based on having received an approval of the client identifier by the authentication server.

14. A network comprising:
an IP router; and
a link layer authentication device having:
(1) means for detecting an establishment of a link with a client device on an identified link port of the link layer authentication device,
(2) means for attempting authentication of a Media Access Control (MAC) address used by the client device attached to the identified link port based on sending, to an authentication server, client device information including a client identifier, and
(3) means for outputting to the IP router an authentication message, the authentication message based on authentication of the client device by the authentication server relative to the client identifier, the authentication message generated by the means for attempting authentication and specifying the client identifier as an authenticated client identifier and the MAC address used by the client device as an authenticated MAC address that is authenticated according to a prescribed link layer authentication protocol to authenticate the use of the MAC address by the client device and to prevent spoofing of the authenticated MAC address; the IP router comprising:
(1) means for receiving the authentication message specifying the authenticated client identifier and the corresponding authenticated MAC address,
(2) means for creating a cache entry in the IP router in response to receiving the authentication message, the cache entry specifying the authenticated client identifier and the corresponding authenticated MAC address based on the authentication message,
(3) the means for receiving further receiving a message originated by the client device and that specifies the authenticated MAC address and a source IP address, the means for creating responding to receiving the message originated by the client device by adding the source IP address to the cache entry specifying the authenticated MAC address based on parsing the message, the IP router implemented as a default gateway for enabling the client device to access the network, and
(4) means for outputting to an audit resource a record that specifies the source IP address and the authenticated MAC address in response to the adding of the source IP address to the cache entry;
wherein any packet output by a given client device and having a corresponding MAC address that has not been authenticated for use by the given client device is contained from access to the network.

15. The network of claim 14, wherein the record specifies the corresponding authenticity client identifier.

16. The network of claim 14, wherein:
the means for receiving receives a second message that specifies the authenticated MAC address and a second source IP address;
the means for creating creating a second cache entry specifying the authenticated client identifier, the corresponding authenticated MAC address, and the second source IP address, based on having determined the second source address is distinct from the source IP address;
the means for outputting to the audit resource outputting a second record specifying the second source IP address and the authenticated MAC address based on creation of the second cache entry.

17. An apparatus comprising:
a cache configured for storing at least one cache entry;
a cache manager configured for creating the cache entry, the cache entry specifying an authenticated client identifier and a corresponding authenticated Media Access Control (MAC) address for a client device attached to a network based on the authenticated MAC address, the cache manager configured for responding to the apparatus receiving a message, originated by the client device and specifying the authenticated MAC address and a source IP address, by adding the source IP address to the cache entry specifying the authenticated MAC address based on parsing the message originated by the client device, the authenticated MAC address based on link layer authentication of a MAC address used by the client device relative to the authenticated client identifier and according to a prescribed link layer authentication protocol to authenticate the use of the MAC address by the client device and to prevent spoofing of the authenticated MAC address;
an Internet Protocol (IP) interface configured for outputting a record to an audit resource, the record generated by the apparatus in response to the cache manager adding the source IP address to the cache entry and specifying the source IP address and the authenticated MAC address, the apparatus implemented as a default gateway for enabling the client device to access the network, wherein any packet output by a given client device and having a corresponding MAC address that has not been authenticated for use by the given client device is contained from access to the network.

18. The apparatus of claim 17, wherein the record generated by the apparatus specifies the corresponding authenticated client identifier.

19. The apparatus of claim 17, wherein:
the IP interface is configured for receiving a second message that specifies the authenticated MAC address and a second source IP address;
the cache manager is configured for creating a second cache entry specifying the authenticated client identifier, the corresponding authenticated MAC address, and the second source IP address, based on having determined the second source IP address is distinct from the source IP address;
the IP interface configured for outputting a second record generated by the apparatus and specifying the second source IP address and the authenticated MAC address based on creation of the second cache entry.

20. The apparatus of claim 17, wherein the IP interface is configured for receiving the authenticated client identifier and the corresponding authenticated MAC address in a message from a link authentication device, the link authentication device having established with the client device a link having the corresponding authenticated MAC address.

21. The apparatus of claim 17, further comprising a link layer authentication portion, the link layer authentication portion further comprising:
a link layer protocol resource configured for detecting establishment of a link with the client device on an identified link port; and
an authentication resource configured for sending, to an authentication server, client device information including a client identifier, the authentication resource configured for selectively designating the client identifier as the authenticated client identifier and the authenticated MAC address relative to the identified link port, based on having received an approval of the client identifier by the authentication server.

* * * * *